United States Patent
Mastrandrea

(10) Patent No.: US 10,723,211 B2
(45) Date of Patent: Jul. 28, 2020

(54) INTEGRATED POWERTRAIN SYSTEM

(71) Applicant: Thunder Power New Energy Vehicle Development Company Limited, Central (HK)

(72) Inventor: Francesco Mastrandrea, Milan (IT)

(73) Assignee: Thunder Power New Energy Vehicle Development Company Limited, Central (HK)

( * ) Notice: Subject to any disclaimer, the term of this patent is extended or adjusted under 35 U.S.C. 154(b) by 0 days.

(21) Appl. No.: 15/675,587

(22) Filed: Aug. 11, 2017

(65) Prior Publication Data
US 2018/0065616 A1    Mar. 8, 2018

Related U.S. Application Data

(60) Provisional application No. 62/384,298, filed on Sep. 7, 2016.

(51) Int. Cl.
*B60K 1/02* (2006.01)
*B60K 1/04* (2019.01)
(Continued)

(52) U.S. Cl.
CPC .............. *B60K 1/02* (2013.01); *B60K 1/04* (2013.01); *B60K 7/0007* (2013.01);
(Continued)

(58) Field of Classification Search
CPC ...... B60W 10/08; B60W 10/26; B60W 20/12; B60K 1/02; B60K 6/365; B60K 17/06;
(Continued)

(56) References Cited

U.S. PATENT DOCUMENTS 7,635,039 B2 * 12/2009 Fujiwara .................. B60K 6/26
180/65.21
8,812,182 B2 * 8/2014 Hennings ................. B60K 6/52
701/22

(Continued)

FOREIGN PATENT DOCUMENTS

| EP | 2 258 569 A2 | 12/2010 |
| EP | 2 697 089 A2 | 2/2014 |
| WO | 2014/145515 A2 | 9/2014 |

OTHER PUBLICATIONS

European Search Report for EP 17189819 dated Jan. 15, 2018, all pages.

*Primary Examiner* — John D Walters
(74) *Attorney, Agent, or Firm* — Kilpatrick Townsend & Stockton, LLP

(57) ABSTRACT

A powertrain system including a first housing, a first electric motor that drives a first wheel, a first inverter coupled to the first electric motor, a first gear reducer coupled to the first electric motor. The first gear reducer couples to a first wheel. The powertrain system also includes a second electric motor that drives a second wheel, a second inverter coupled to the second electric motor, a second gear reducer coupled to the second electric motor. The second gear reducer couples to a second wheel. The housing houses the first electric motor, the first inverter, the first gear reducer, the second electric motor, second inverter, and the second gear reducer.

14 Claims, 7 Drawing Sheets

(51) Int. Cl.
*B60K 7/00* (2006.01)
*B60K 17/356* (2006.01)
*B60K 17/04* (2006.01)
*B60L 50/16* (2019.01)
*B60L 15/20* (2006.01)
*B60W 10/08* (2006.01)
*B60W 10/26* (2006.01)
*B60L 58/10* (2019.01)
*B60W 20/12* (2016.01)
*B60K 6/365* (2007.10)
*B60K 17/06* (2006.01)

(52) U.S. Cl.
CPC .......... *B60K 17/046* (2013.01); *B60K 17/356* (2013.01); *B60L 15/2045* (2013.01); *B60L 50/16* (2019.02); *B60W 10/08* (2013.01); *B60W 10/26* (2013.01); *B60K 6/365* (2013.01); *B60K 17/06* (2013.01); *B60L 58/10* (2019.02); *B60W 20/12* (2016.01); *Y02T 10/7258* (2013.01)

(58) Field of Classification Search
CPC .. B60K 7/0007; B60K 17/046; B60K 17/356; B60K 1/04; B60L 11/14; B60L 15/2036; B60L 15/2045; B60L 11/1851; B60L 50/16
USPC .............................................. 180/65.31, 65.6
See application file for complete search history.

(56) References Cited

U.S. PATENT DOCUMENTS

| | | | |
|---|---|---|---|
| 9,030,063 B2 * | 5/2015 | Rawlinson | B60H 1/00278 310/52 |
| 9,120,389 B1 * | 9/2015 | Rawlinson | B60L 11/1803 |
| 9,126,500 B2 * | 9/2015 | Ozaki | B60L 3/06 |
| 9,168,818 B2 * | 10/2015 | Hirai | B60G 3/00 |
| 9,692,277 B2 * | 6/2017 | Pearce, Jr. | B60H 1/00392 |
| 2015/0042245 A1 | 2/2015 | Shinohara et al. | |
| 2015/0328993 A1 * | 11/2015 | Shin | H02M 7/5387 307/10.1 |
| 2016/0039277 A1 * | 2/2016 | Falls | B60K 1/02 180/62 |
| 2016/0229293 A1 * | 8/2016 | Seo | B60K 6/52 |

* cited by examiner

INTEGRATED POWERTRAIN SYSTEM

PRIORITY CLAIM

This Application claims priority to U.S. Provisional Application No. 62/384,298, entitled ELECTRIC VEHICLE COMPONENTS, filed on Sep. 7, 2016, in its entirety.

FIELD OF THE INVENTION

The disclosure generally relates to an electric vehicle.

BACKGROUND OF THE INVENTION

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Electric vehicles are growing in popularity as society becomes more and more concerned about carbon emissions and sustainable/renewable energy sources. Electric vehicles operate using electric power stored in one or more batteries. During operation, the stored electrical energy is controllably released to drive an electric motor. The electric motor converts the electrical energy into mechanical energy, which propels the vehicle.

SUMMARY OF THE INVENTION

The embodiments discussed below include an integrated powertrain system for an electric vehicle. Powertrains include a variety of components that enable power transfer to the wheels. The embodiments discussed below house these components within a single housing for a rear powertrain and/or a front powertrain. For example, the integrated powertrain system may incorporate an electric motor, gear reducer, communication lines, cooling system, etc. into a single housing instead of a separate housing, wiring, cooling, etc. for each of the electric motors. In this way the integrated powertrain system is able to reduce the number of components, wiring complexity, etc. in the electric vehicle. By reducing manufacturing complexity (e.g., number of components, assembly) the electric vehicle may be manufactured at lower costs.

BRIEF DESCRIPTION OF THE DRAWINGS

Various features, aspects, and advantages of the present invention will be better understood when the following detailed description is read with reference to the accompanying figures in which like characters represent like parts throughout the figures, wherein.

DETAILED DESCRIPTION

One or more specific embodiments of the present invention will be described below. These embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
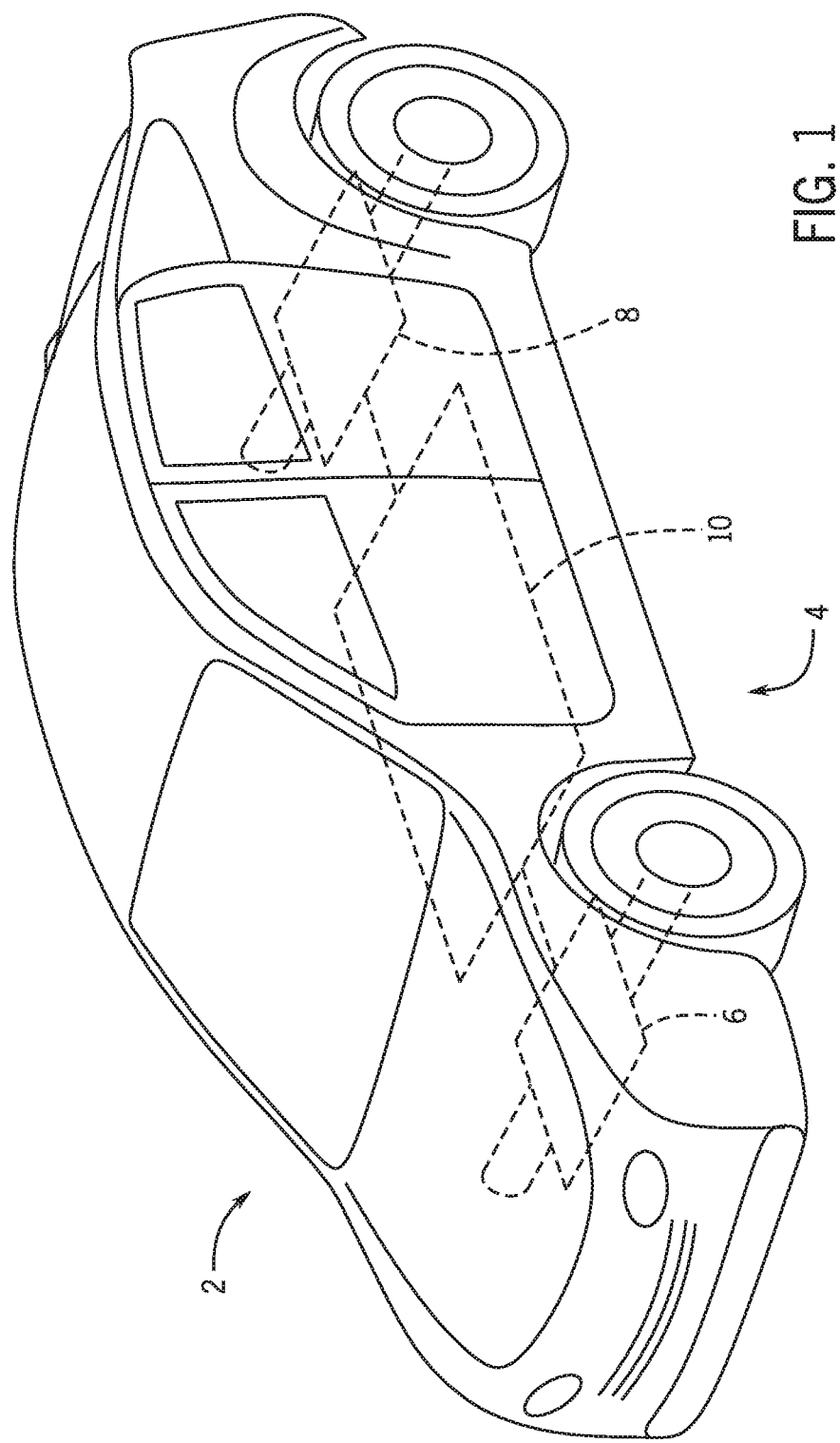
FIG. 1 is a perspective view of an embodiment of an electric vehicle with an integrated powertrain system and an integrated battery system.

FIG. 1 is a perspective view of an electric vehicle 2. The electric vehicle 2 includes an integrated powertrain system 4 with a front powertrain 6 and a rear powertrain 8. In operation, the front powertrain 6 drives the front wheels while the rear powertrain 8 drives the rear wheels. The powertrain system 4 is powered with a battery system 10 that provides power to electric motors in the integrated powertrain system 4. As will be explained in detail below, the integrated powertrain system 4 and battery system 10 reduces the number of components, wiring complexity, etc. in the electric vehicle 2. The design of the vehicle 2 may therefore reduce manufacturing complexity (e.g., number of components, assembly) as well as manufacturing costs.

Figure 2:
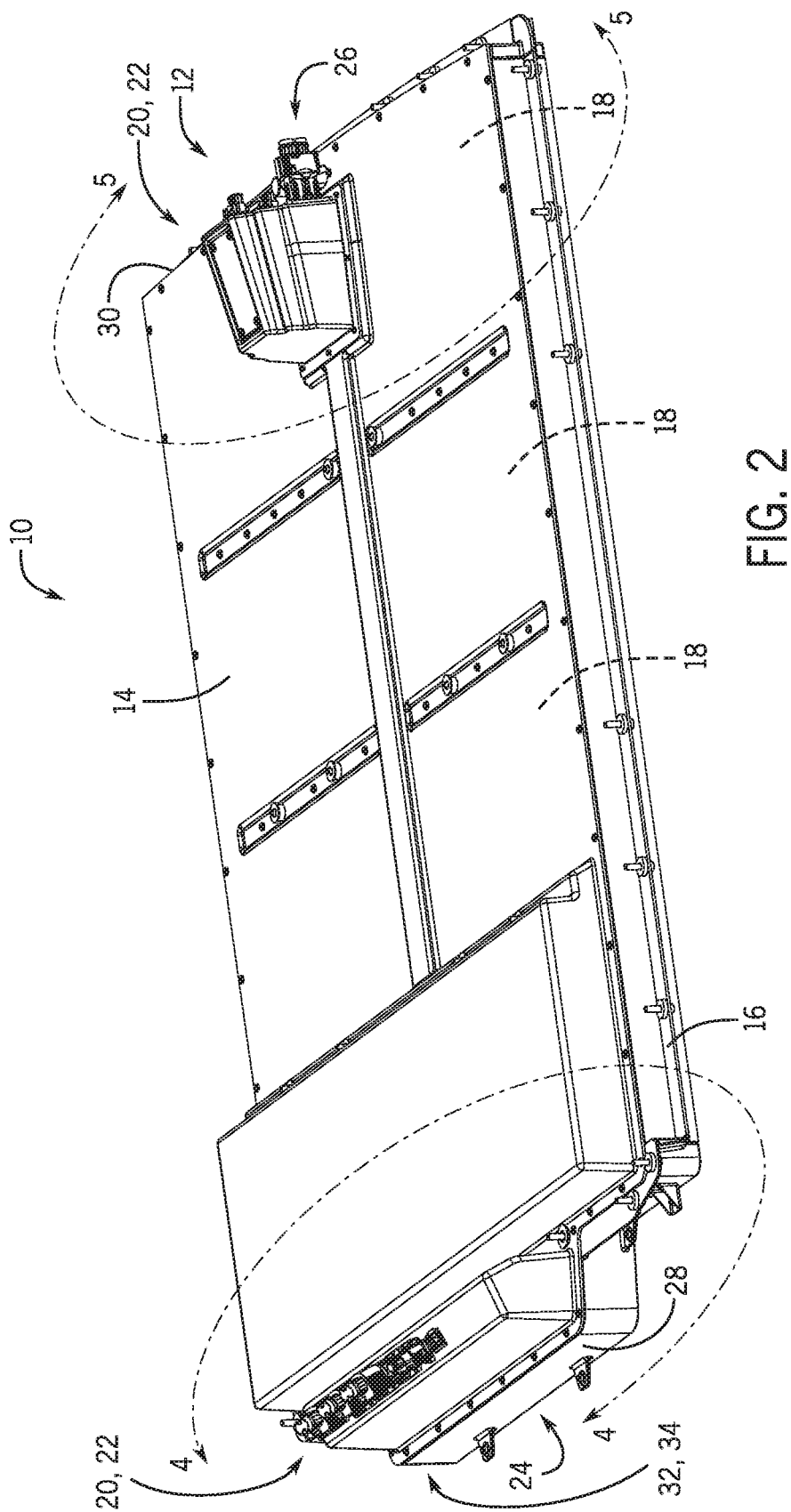
FIG. 2 is a perspective view of an embodiment of an electric vehicle battery system.

FIG. 2 is a perspective view of an embodiment of an electric vehicle battery system 10 that reduces the number of components, wiring complexity, etc. in an electric vehicle. Specifically, the vehicle 2 includes contactors and connectors within the battery system 10 that are typically placed in different housings and at different locations on vehicle 2. The battery system 10 includes a housing 12 with a first battery housing member 14 and a second battery housing member 16. The first and second battery housing members 14, 16 may couple together in a variety of ways including threaded fasteners, welding, etc. to form the housing 12. The battery housing 12 houses a variety of components including battery cells 18 (e.g., 1, 2, 3, 4, 5, 10, 15 or more cells), contactors 20, connectors 22, wires, sensors, etc. that work together to connect the stored electrical energy in the battery cells 18 to various vehicle systems (e.g., AC compressor, motors, heating system) as well as to recharge the battery cells 18 for future use.

The battery housing 12 may include specially designed sections/portions that may be integrally formed into the housing 12. The sections/portions may form sub-housings/compartments for various electrical components within the housing 12. By forming these sub-housings/compartments into the battery housing 12 the battery system 10 reduces manufacturing complexity by reducing the number of housings needed for electrical components (e.g., connectors for connecting the electrical components in the housings), wiring complexity, as well as the amount of wiring, etc. As illustrated, the housing 12 includes integral housings/compartments 24, 26. These housings/compartments 24, 26 are at respective ends 28, 30 of the battery system 10. By positioning the housings/compartments 24, 26 at respective ends 28, 30 of the housing 12, the housing 12 may facilitate connection of the battery system 10 to various systems on the electrical vehicle 2. However, in some embodiments the housings/compartments 24, 26 may be positioned at other locations on the housing 12 (e.g., center, sides).

These housings/compartments 24, 26 enable integration of a fast charging system 32 (e.g., direct current charging system) and an onboard charger system 34 (e.g., A/C to DC charging system) into the battery system 10. Accordingly, separate housings, additional connectors, and complex wiring are not needed for the fast charging system 32 and onboard charger system 34.

Figure 3:
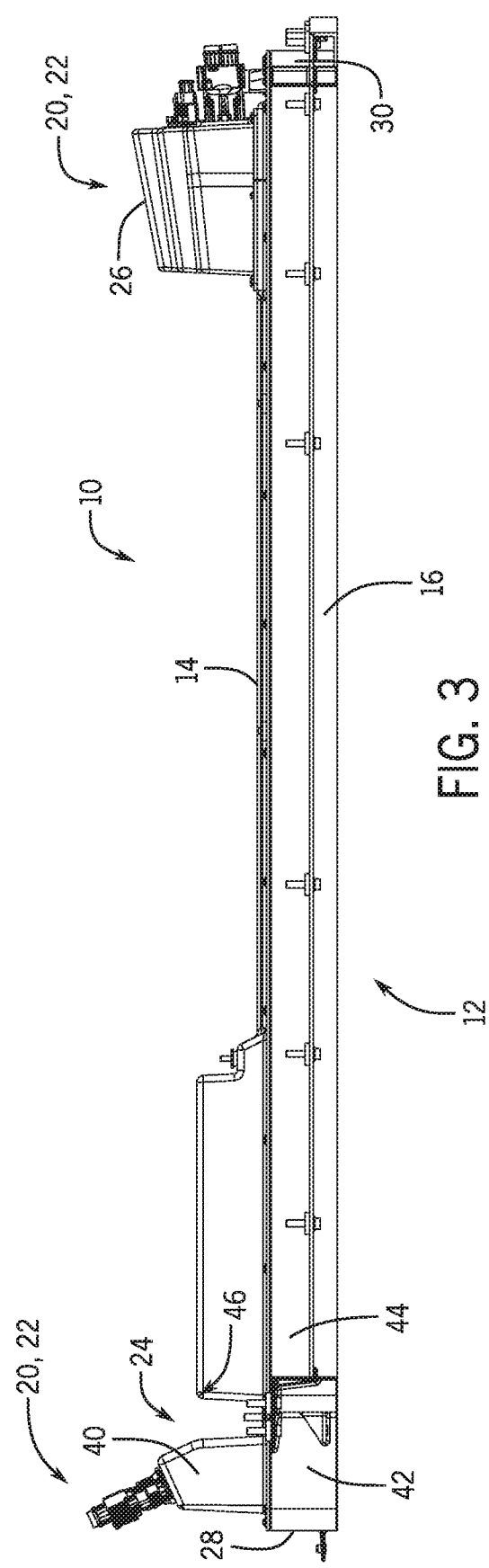
FIG. 3 is a side view of an embodiment of an electric vehicle battery system.

FIG. 3 is a side view of an embodiment of an electric vehicle battery system 10. As illustrated, the housings/compartments 24, 26 are either integrally formed into or coupled to the first battery housing member 14. For example, the first connector housing 24 may be formed with a first connector housing portion 40 and a second connector housing portion 42. As illustrated, the first battery housing member 14 and the first connector housing portion 40 are one-piece (e.g., integral). In some embodiments, the first battery housing member 14 and the first connector housing portion 40 couple together with an integral flange 44 to form a gap 46. The gap 46 may reduce electromagnetic interference as well as protect the components in the connector housing from the battery cells 18. The second connector housing 42 and the second battery housing member 16 are likewise one-piece, which reduces the need to manufacture additional housings to store the components in the connector housing 24.

As explained above, on the opposite end 30, the battery system 10 includes a second connector housing 26. In some embodiments, the second connector housing 26 may be formed out of one-piece with the first battery housing member 14 or may be a separately formed piece that couples to the first battery housing member 14 to form the second connector housing 26.

Figure 4:
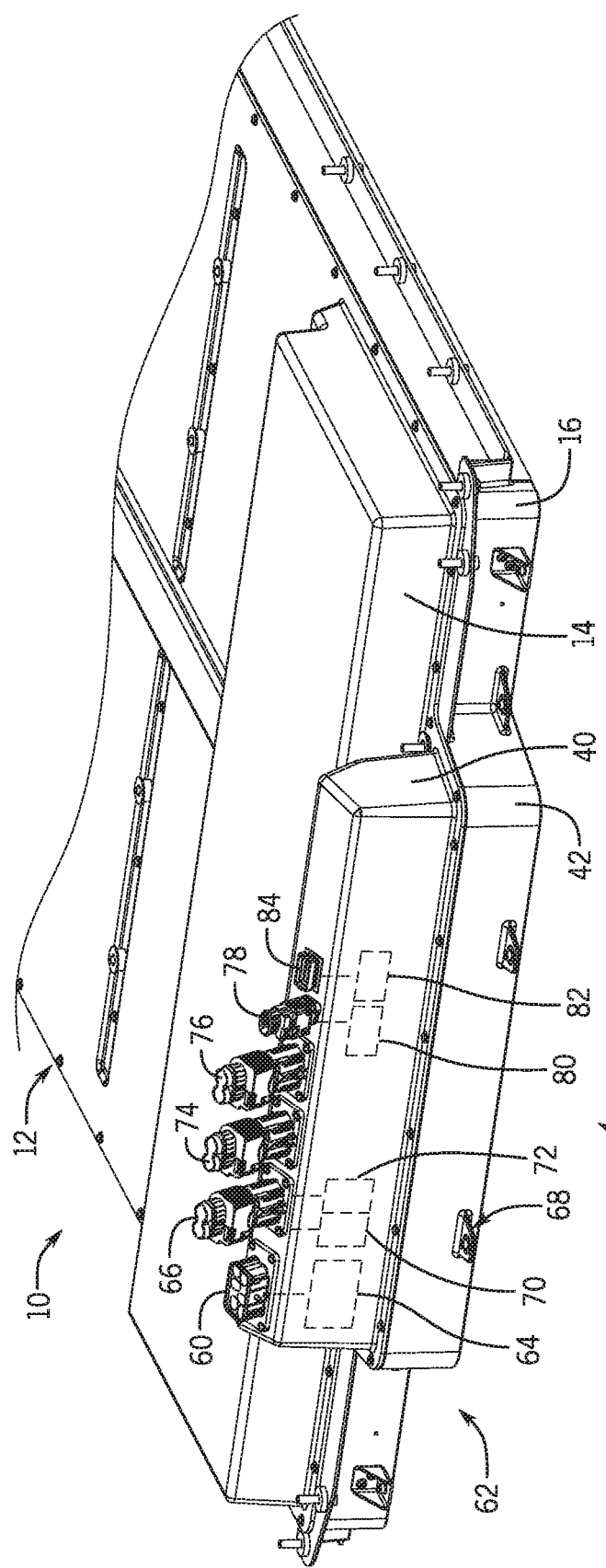
FIG. 4 is a sectional view of an embodiment of an electric vehicle battery system within line 4-4 of FIG. 2.

FIG. 4 is a sectional view of an embodiment of an electric vehicle battery system 10 within line 4-4 of FIG. 2. As illustrated, the first connector housing 24 includes a variety of connectors 22 that electrically couple the battery system 10 to the vehicle 2. Starting from the left, the first connector is an onboard charger connector 60. The onboard charger connector 60 forms part of the charger system 62 that converts electricity from an A/C source (e.g., A/C outlet at vehicle owner's home) into a direct current for charging the cells 18. In addition to the onboard charger connector 60, the charger system 62 includes a connector 64 that converts A/C into DC, which in turn couples to the cells 18. By including, the connector 64 in the battery housing 12, the battery system 10 may reduce the number of connectors on the vehicle 2 because the battery system 10 does not couple to a separate housing containing the connector 64. In addition to fewer connectors 22, placement of the charger system 62 in the battery housing 12 reduces the amount of wiring and the production of a separate housing.

Next to the onboard charger connector 60, is a fast charger connector 66 for a fast charger system 68. In operation, the fast charger system 68 enables the battery system 10 to receive direct current power from a fast charging station. Because a fast charging station transmits significant amounts of electrical power to the vehicle 2, the connector 66 may have a rating (up to 1200V) to handle the power. Furthermore, to control the flow of power from the fast charging station, the fast charger system may include first and second fast charger contactors 70, 72. The first fast charger contactor 70 couples to a positive polarity terminal, while the second fast charger contactor 72 couples to a negative polarity terminal. The first and second fast charger contactors 70, 72 in turn electrically couple to the battery cells 18. Similar to the discussion above, by including the fast charger system 68 in the battery housing 12, the battery system 10 may reduce the number of connectors on the vehicle 2 because the battery system 10 does not couple to a separate housing containing the contactors 70, 72. In addition to fewer connectors, placement of the fast charger system 68 in the battery system 10 reduces the amount of wiring and the production of a separate housing.

The connector housing 24 may also include additional high voltage connectors 74 and 76 (e.g., motor connectors) that connect the battery system 10 to one or more converters that transform DC produced by the battery cells 18 into A/C for use by integrated powertrain system 4 (i.e., electric vehicle motors). Next to the high voltage connectors 74 and 76 is a transformer connector 78 that couples to a transformer 80 that steps down the voltage produced by the battery cells 18. The transformer connector 78 is thereby able to transmit low voltage power to the onboard vehicle electronics. In some embodiments, the transformer 80 is within the connector housing 24 which may further reduce wiring, production of a separate housing, and the number of connectors on the vehicle 2.

In order to monitor the battery system 10, the battery system 10 may include one or more sensors 82. The sensors 82 may monitor: current flow, voltage, temperature, etc. In order to couple the sensors 82 to the vehicle's computer, the connector housing 24 includes one or more sensor connectors 84. The sensor connector 84 enables the sensors 82 to transmit signals to the vehicle's computer that the vehicle's computer uses to monitor and/or control various systems of the electric vehicle 2.

Figure 5:
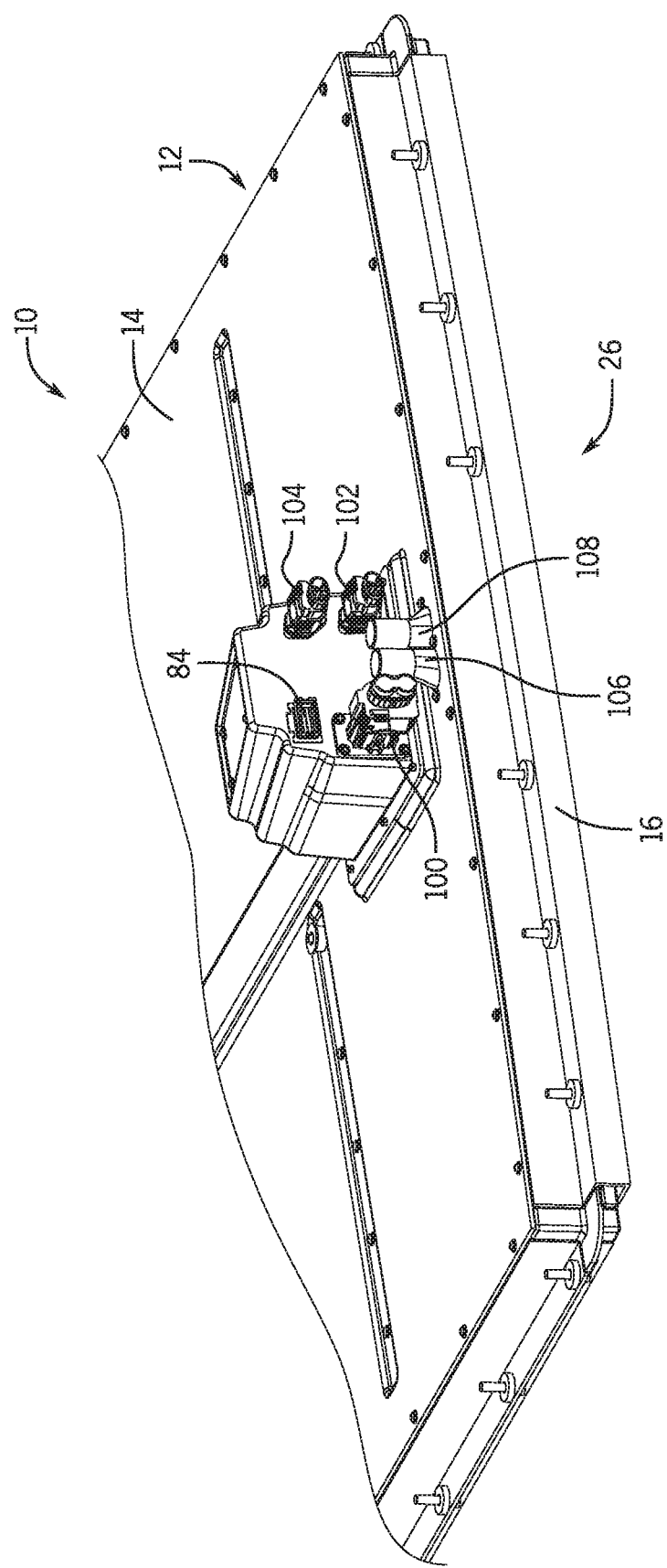
FIG. 5 is a sectional view of an embodiment of an electric vehicle battery system within line 5-5 of FIG. 2.

FIG. 5 is a sectional view of an embodiment of an electric vehicle battery system 10 within line 5-5 of FIG. 2. As explained above, the second connector housing 26 may be integrally (e.g., one-piece) formed out of the first battery housing member 14, which may facilitate manufacturing (e.g., fewer parts, less assembly). In some embodiments, the second connector housing 26 may be separately formed and then coupled to the first battery housing member 14 with fasteners (e.g., threaded fasteners).

As illustrated, the second connector housing 26 includes a variety of connectors 22 that electrically couple the battery system 10 to the vehicle 2. For example, the second connector housing 26 may include high voltage connector 100 (e.g., a motor connector) that couples the battery system 10 to the integrated powertrain 4. The second connector housing 26 also include a compressor connector 102 and a heater connector 104. The compressor connector 102 enables the battery system 10 to provide power to an electric motor that drives a coolant compressor. The coolant compressor in turn works with the climate control system to cool the vehicle cabin. The heater connector 104 also provides power for the climate control system, but instead of cooling the heater connector 104 enables the climate control system to heat the cabin. For example, the heater connector 104 may couple to a resistance heater that generates heat with the electrical power from the battery system 10.

As explained above, the battery system 10 may include one or more sensors 82. The sensors 82 may monitor, current flow, voltage, temperature, etc. The sensors 82 couple to the vehicle's computer, with one or more sensor connectors 84. The sensor connectors 84 enable the sensors 82 to transmit signals to the vehicle's computer, which the vehicle's computer uses to monitor and/or control various systems of the electric vehicle 2. As illustrated, the second connector housing 26 includes a sensor connector 84 as well.

During operation, the battery system 10 generate heat due to internal resistance. In order to maintain the temperature of the battery system 10, the battery system 10 may include one or more conduits and/or passages within the housing 12. These conduits and/or passages enable a temperature controlled fluid to flow through the battery. The housing 12 provides access to the these conduits and/or passages through a fluid inlet 106 and a fluid outlet 108. The fluid inlet 106 and/or outlet 108 may couple to the first battery housing member 14 or the second battery housing member 16. In some embodiments, the fluid inlet 106 or the fluid outlet 108 may couple to the first battery housing member 14 while the other couples to the second battery housing member 16.

Figure 6:
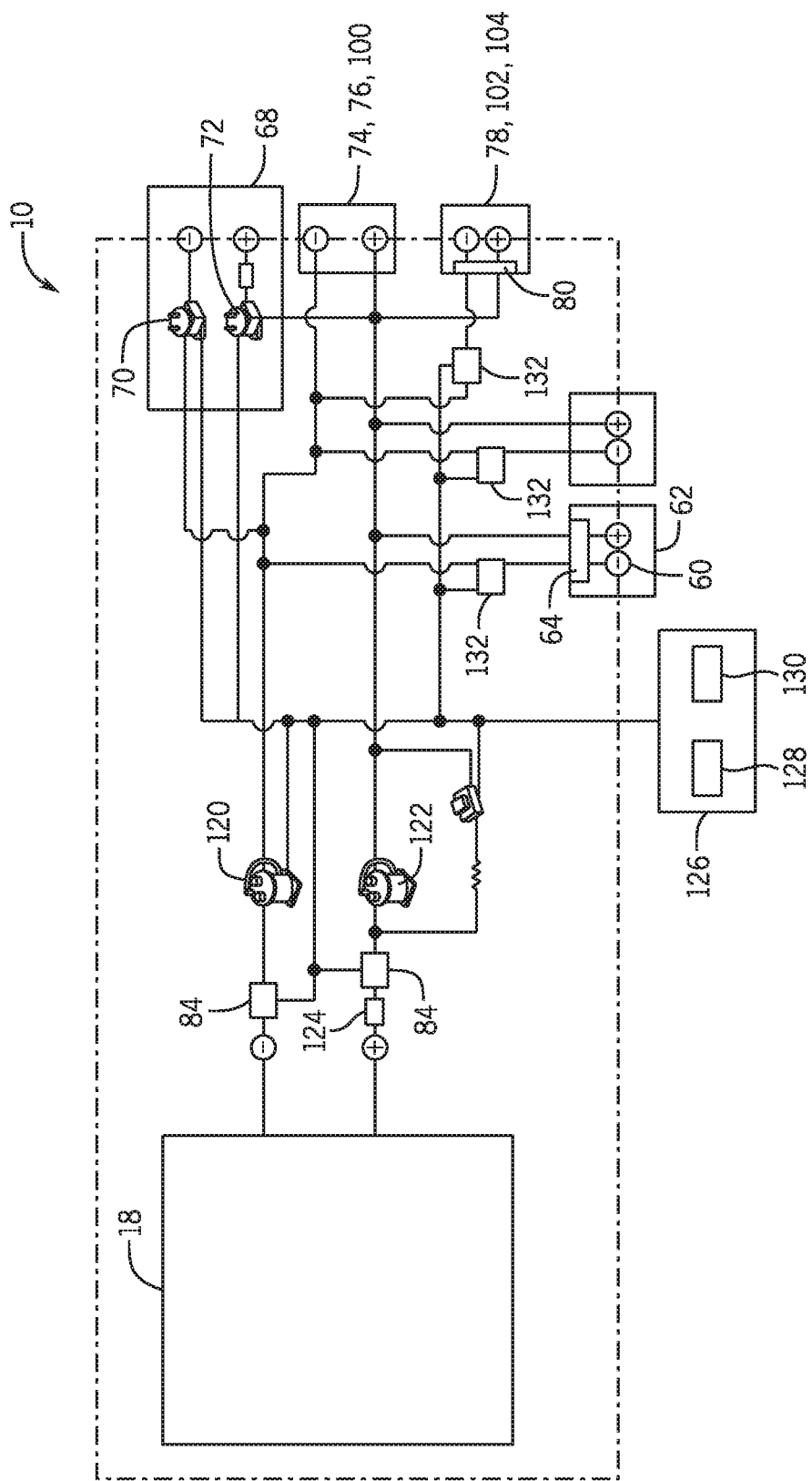
FIG. 6 is a schematic view of an embodiment of an electric vehicle battery system.

FIG. 6 is a schematic view of an embodiment of an electric vehicle battery system 10. The battery system 10 includes first and second main contactors 120, 122 that control the flow of electrical power to and from the cells 18. To monitor the flow of power, the battery system 10 may include one or more sensors 84 (e.g., voltage sensors, current sensors, Hall effect sensors, temperature sensors). These sensors 84 couple to the vehicle computer 126, which receives and processes the signals. The computer 126 includes a processor 128 and a memory 130. In operation, the processor 128 uses instructions stored on the memory 130 to process the signals and to control the various contactors 20.

As explained above, the battery system 10 includes additional contactors 70 and 72 that form part of the fast charger system 68. These contactors 70, 72 are integrated into the battery system 10 to facilitate manufacturing and reduce complexity. More specifically, including these contactors in the battery housing 12 reduces the numbers of housings, connectors, wiring, etc. Similarly, an onboard charger system 62 may be integrated into the battery housing 12 to facilitate charging of the battery from an A/C source. The onboard charger system 62 includes a connector 64 that converts A/C power into DC power for charging the cells 18. The battery system 10 may also include one or more low power connectors (e.g., connector 78, connector 102, and connector 104) for powering various vehicle systems (e.g., HVAC, computer). Coupled to some or all of these connectors is one or more transformers 80 that reduce the power from the cells 18 for use by these different vehicle systems. The battery system 10 controls power to these different connectors using the contactors 120 and 122 as well as one or more relays 132. The relays 132 are similarly controlled by the computer 126. Other connectors 22 in the battery system 10 include high voltage connectors (e.g., connector 74, connector 76, connector 100) that transfer power form the battery system 10 to the integrated powertrain system 4, which uses significant amounts of power to move the vehicle 2. In summary, integrating these components into the battery system 10 may reduce manufacturing complexity (e.g., wiring, housings, connectors).

Figure 7:
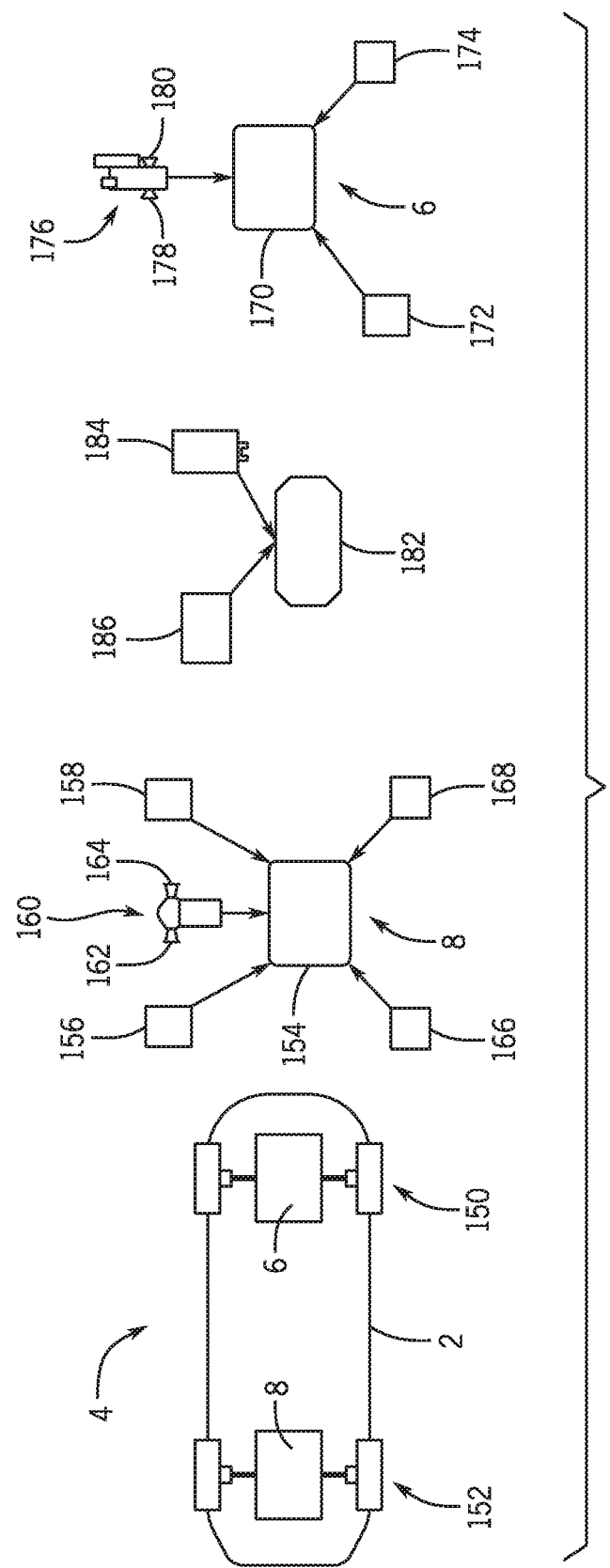
FIG. 7 is a schematic view of an embodiment of an electric vehicle with the integrated powertrain system.

FIG. 7 is a schematic bottom view of an embodiment of an electric vehicle 2 with the integrated powertrain system 4. As explained above, the integrated powertrain system 4 includes a front powertrain 6 and a rear powertrain 8. The front and rear powertrains 6, 8 power the respective front and rear wheels 150, 152. However, instead of including multiple housings for various components these integrated powertrains incorporate multiple components into a single housing. For example, the rear integrated powertrain 6 may incorporate an electric motor, gear reducer, communication lines, cooling system, etc. into a single housing instead of separate housings, wiring, cooling, etc. for each of the electric motors. The integrated powertrain system 4 is therefore able to reduce the number of components, wiring complexity, etc. in the electric vehicle 2. With reduced manufacturing complexity (e.g., number of components, assembly) the vehicle 2 may be manufactured at lower costs.

As illustrated, the rear powertrain 8 may include a single housing 154 that houses a first electric motor 156 and a second electric motor 158. The electric motors 156, 158 couple to a transmission 160 that includes a first gear reducer 162 and a second gear reducer 164. The first and second gear reducers 162, 164 in turn couple to a respective rear wheel to increase the torque from the respective electric motors 156, 158. The housing 154 may also include a first inverter 166 and a second inverter 168 that convert direct current (DC) from the battery system 10 into alternating current (A/C) for each of the electric motors 156, 158. By including two electric motors in the rear integrated powertrain 8, the vehicle 2 is able to provide torque vectoring to the to the rear wheels 152. Torque vectoring is the ability to vary torque to individual wheels (e.g., rear wheels 152). For example, while driving the vehicle 2 is able to adjust the torque to each of the rear wheels 152 to adjust for changing road conditions and associated traction (e.g., one wheel encounters an slick portion on the road). This provides the driver with a more responsive drive.

The front integrated powertrain 6 may be similarly constructed with a single housing that houses an electric motor 172, an inverter 174, and a transmission 176. The transmission may include third and fourth gear reducers 178, 180 that transfer power from the single electric motor 172 to the front wheels 150. In some embodiments, the front integrated power train 6 may constructed similar to the front integrated powertrain 6. That is the front integrated powertrain 6 may include two electric motors and two inverters in order to provide torque vectoring to the front heels 150 within a single housing.

In some embodiments, the integrated powertrain system 4 includes an energy interface unit 182. The energy interface unit 182 combines a DC/DC converter 184 and the onboard computer 186 into a single housing that then couples to the housing 154 of the rear integrated powertrain 8.

While several embodiments and arrangements of various components are described herein, it should be understood that the various components and/or combination of components described in the various embodiments may be modified, rearranged, changed, adjusted, and the like. For example, the arrangement of components in any of the described embodiments may be adjusted or rearranged and/or the various described components may be employed in any of the embodiments in which they are not currently described or employed. As such, it should be realized that the various embodiments are not limited to the specific arrangement and/or component structures described herein.

In addition, it is to be understood that any workable combination of the features and elements disclosed herein is also considered to be disclosed. Additionally, any time a feature is not discussed with regard in an embodiment in this disclosure, a person of skill in the art is hereby put on notice that some embodiments of the invention may implicitly and specifically exclude such features, thereby providing support for negative claim limitations.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

What is claimed is:

1. A powertrain system, comprising:
    a first housing and a second housing;
    a first electric motor configured to drive a first wheel;
    a first inverter coupled to the first electric motor;
    a first gear reducer coupled to the first electric motor, wherein the first gear reducer is configured to couple to the first wheel;
    a second electric motor configured to drive a second wheel;
    a second inverter coupled to the second electric motor;
    a second gear reducer coupled to the second electric motor, wherein the second gear reducer is configured to couple to the second wheel;
    a third electric motor configured to drive a third wheel and a fourth wheel; and
    an energy interface unit comprising a DC/DC converter; and,
    wherein the first housing is configured as single structure having a rectangular shape, and completely encloses the first electric motor, the first inverter, the first gear reducer, the second electric motor, the second inverter, first communication lines, a first cooling system and the second gear reducer, and the energy interface unit is coupled to the first housing; and
    the second housing configured as single structure having a rectangular shape, and completely encloses the third electric motor, second communication lines, and a second cooling system.

2. The powertrain system of claim 1, wherein the second housing completely encloses a third inverter and a third gear reducer.

3. The powertrain system of claim 2, wherein the second housing completely encloses a transmission coupled to the third gear reducer.

4. The powertrain system of claim 1, comprising a third housing wherein the third housing completely encloses an onboard computer, and wherein the third housing is operatively connected to the second housing.

5. The powertrain system of claim 4, wherein the third housing completely encloses a DC/DC converter.

6. An electric vehicle, comprising:
    a powertrain system, comprising:
        a first housing;
        a first electric motor configured to drive a first wheel;
        a first inverter coupled to the first electric motor;
        a first gear reducer coupled to the first electric motor, wherein the first gear reducer couples to the first wheel;
        a second electric motor configured to drive a second wheel;
        a second inverter coupled to the second electric motor;
        a second gear reducer coupled to the second electric motor, wherein the second gear reducer couples to the second wheel;
        a third electric motor configured to drive a third wheel and a fourth wheel; and
        an energy interface unit comprising a DC/DC converter; and,
    wherein the first housing is configured as single structure having a rectangular shape, and completely encloses the first electric motor, the first inverter, the first gear reducer, the second electric motor, the second inverter, first communication lines, a first cooling system and the second gear reducer, and the energy interface unit is coupled to the first housing; and
    the second housing configured as single structure having a rectangular shape, and completely encloses the third electric motor, second communication lines, and a second cooling system.

7. The electric vehicle of claim 6, wherein the first and second wheels are front wheels on the electric vehicle.

8. The electric vehicle of claim 6, wherein the first and second wheels are rear wheels on the electric vehicle.

9. The electric vehicle of claim 8, wherein the third and fourth wheels are front wheels on the electric vehicle.

10. The electric vehicle of claim 8, wherein the second housing completely encloses a third inverter and a third gear reducer.

11. The electric vehicle of claim 8, wherein the second housing completely encloses a transmission coupled to the third gear reducer.

12. The electric vehicle of claim 8, comprising a third housing wherein the third housing completely encloses an onboard computer, and wherein the third housing is operatively connected to the second housing.

13. The electric vehicle of claim 12, wherein the third housing completely encloses a DC/DC converter.

14. The electric vehicle of claim 12, wherein the third housing couples to the second housing.

* * * * *